May 15, 1956  E. D. HAWKINS  2,745,452
MACHINE FOR PUNCHING NUT KERNELS FROM THEIR SHELLS
Filed June 25, 1951  7 Sheets-Sheet 1

Inventor
Eric Davy Hawkins
Karl W. Flocks
Attorney

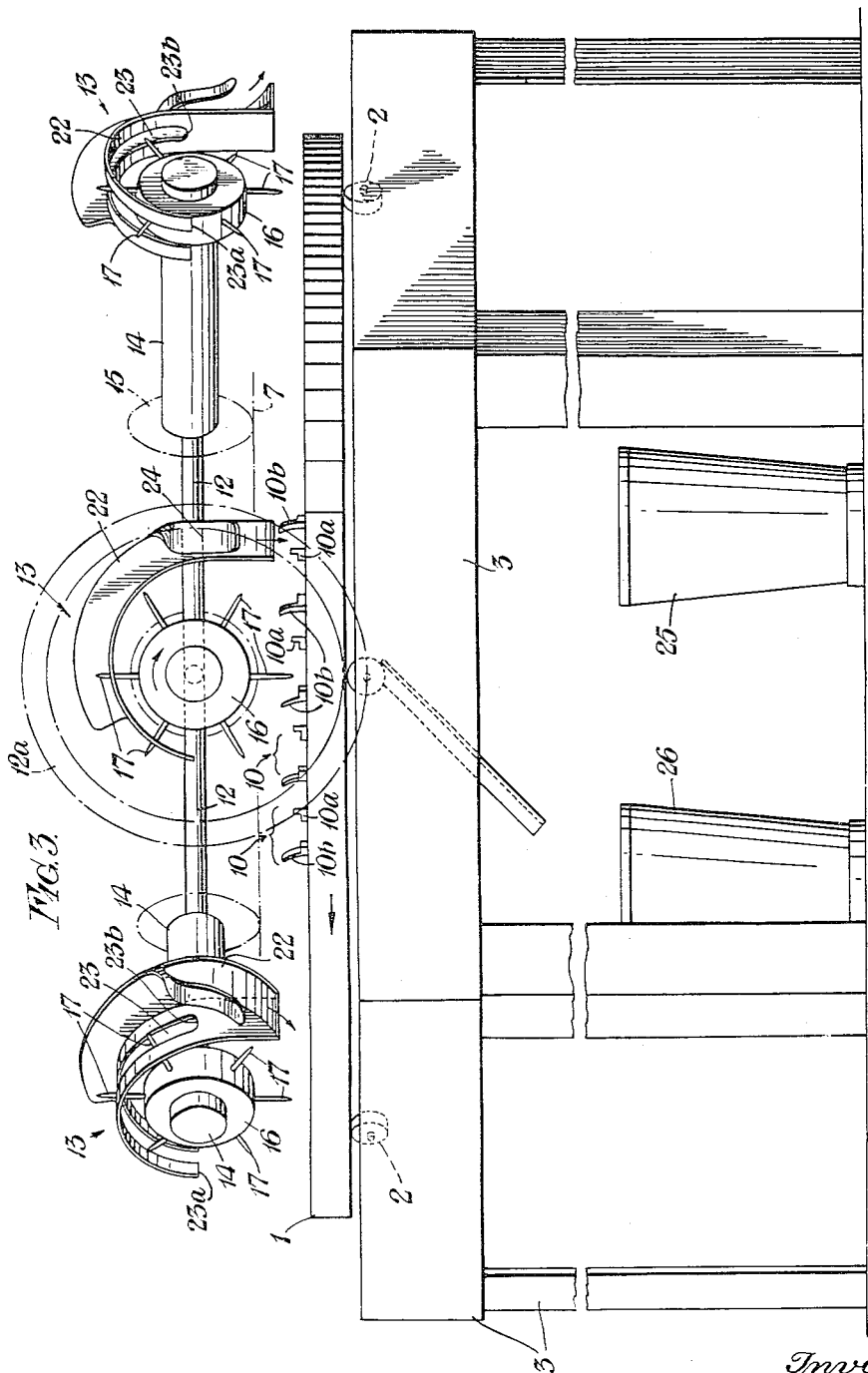

May 15, 1956 E. D. HAWKINS 2,745,452
MACHINE FOR PUNCHING NUT KERNELS FROM THEIR SHELLS
Filed June 25, 1951 7 Sheets-Sheet 3
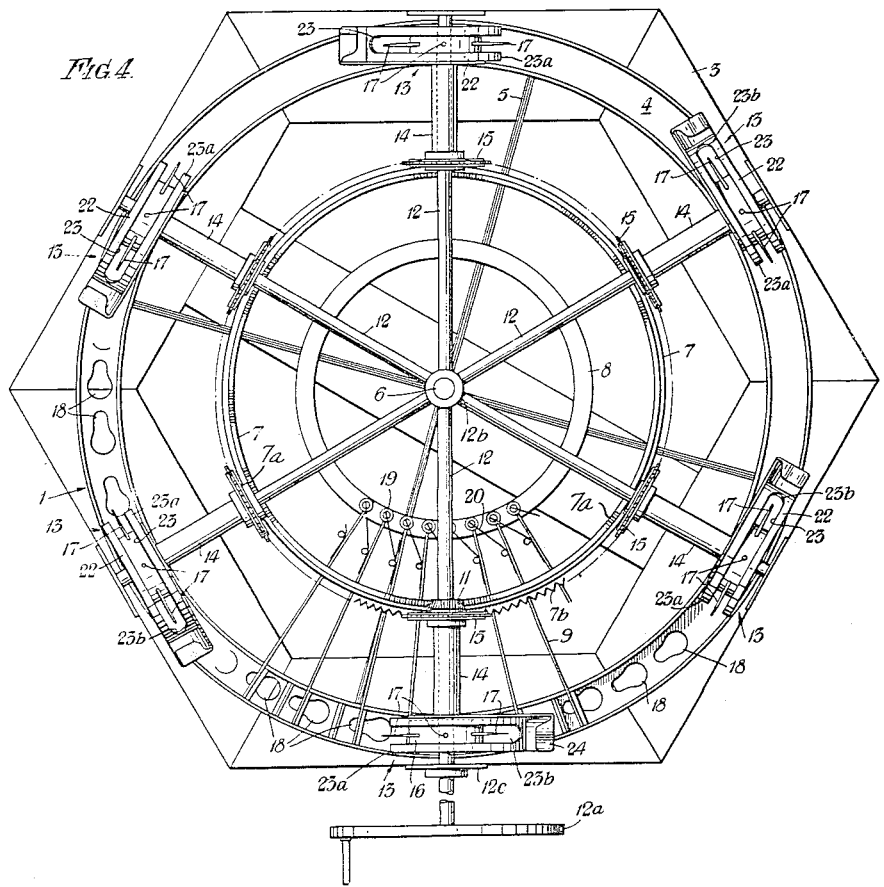
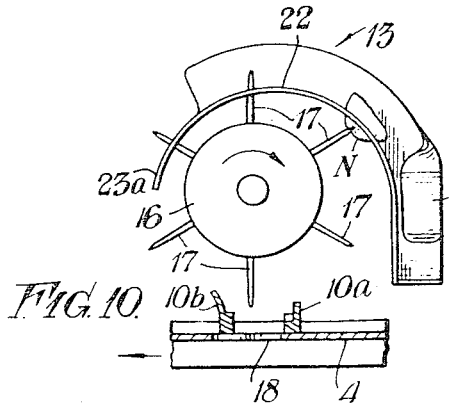
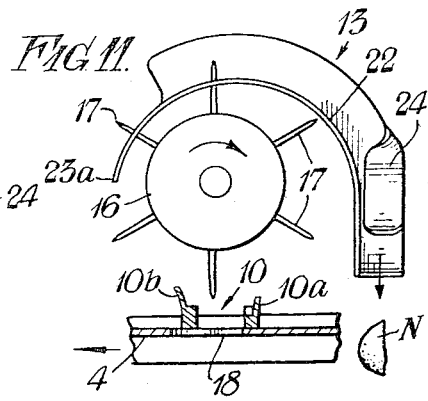
Inventor
Eric Davy Hawkins
Karl W. Flocks
Attorney May 15, 1956 E. D. HAWKINS 2,745,452
MACHINE FOR PUNCHING NUT KERNELS FROM THEIR SHELLS
Filed June 25, 1951 7 Sheets-Sheet 4
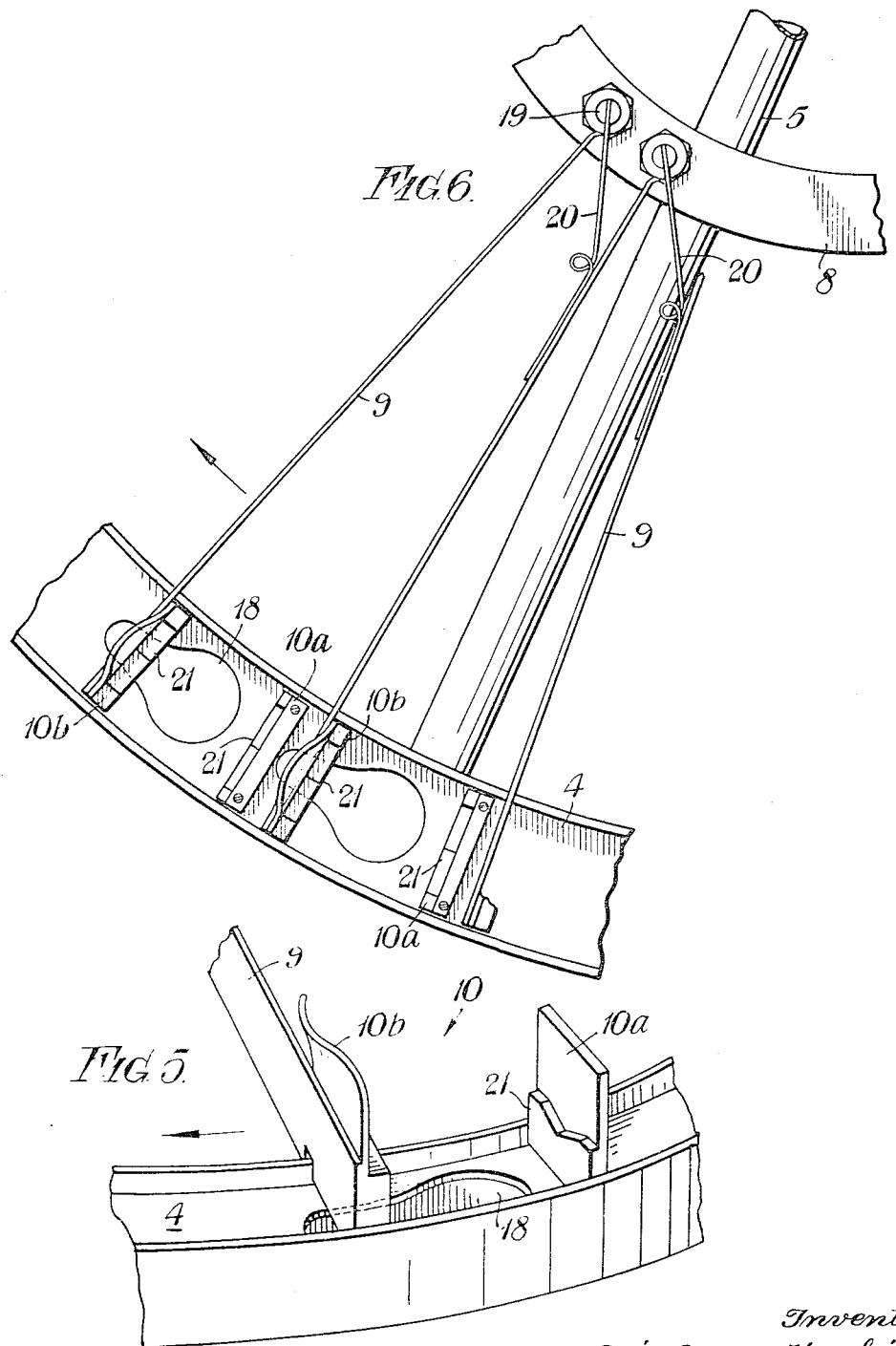
Inventor
Eric Davy Hawkins
Karl W. Flocks
Attorney

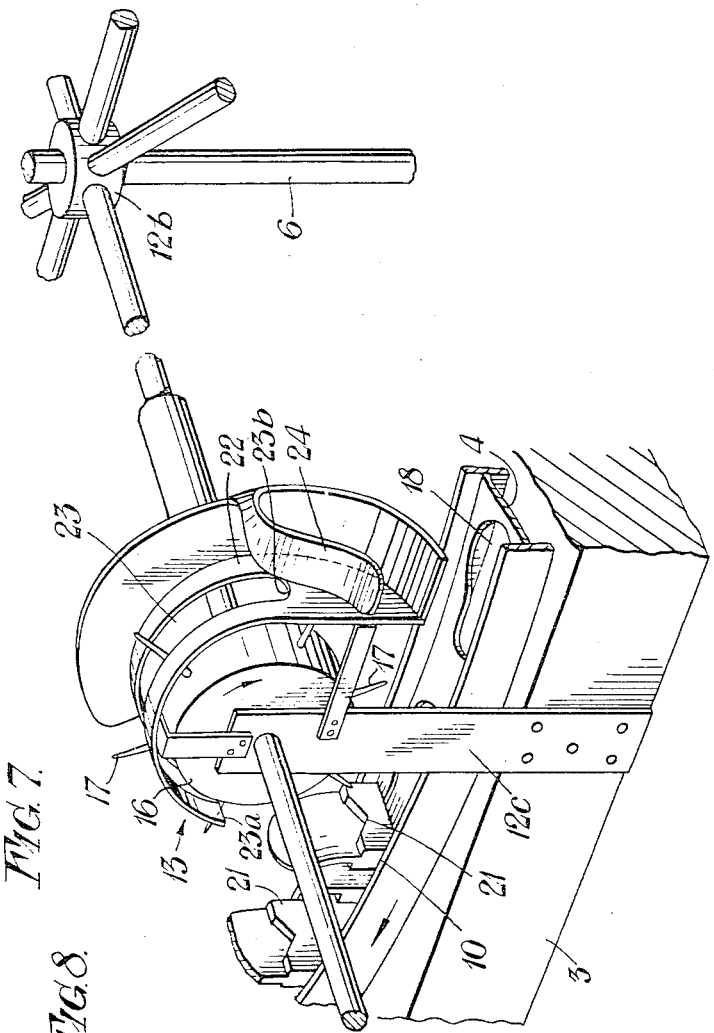
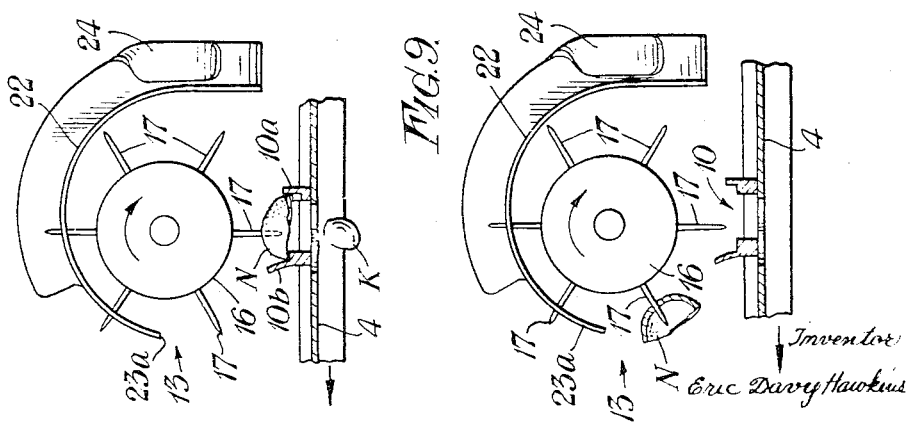

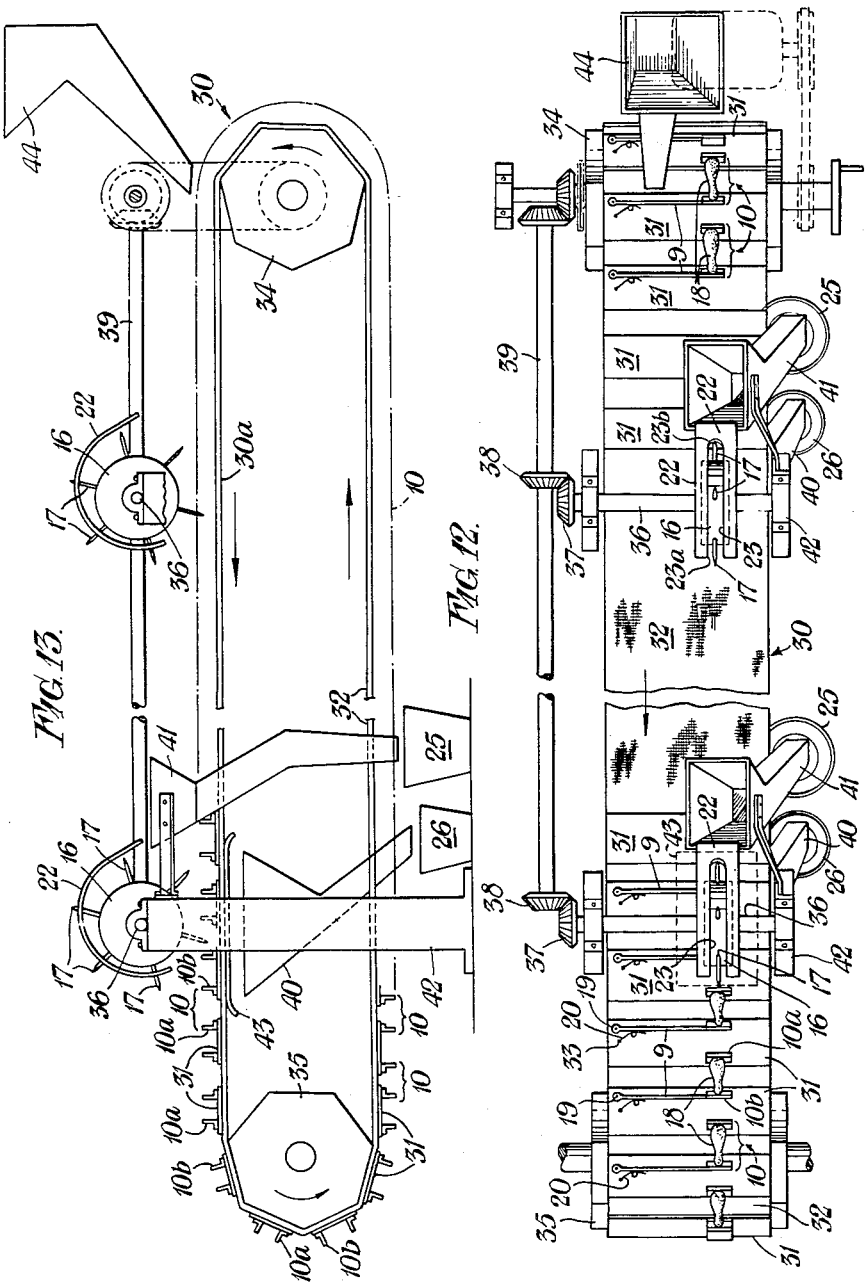

May 15, 1956 E. D. HAWKINS 2,745,452
MACHINE FOR PUNCHING NUT KERNELS FROM THEIR SHELLS
Filed June 25, 1951 7 Sheets-Sheet 7

Inventor
Eric Davy Hawkins

Karl W. Flocks
Attorney

United States Patent Office 2,745,452
Patented May 15, 1956

2,745,452
MACHINE FOR PUNCHING NUT KERNELS FROM THEIR SHELLS

Eric D. Hawkins, Limbe, Nyasaland Protectorate

Application June 25, 1951, Serial No. 233,578

Claims priority, application Great Britain August 8, 1950

5 Claims. (Cl. 146—8)

This invention concerns nut shelling machines, and has for an object to provide a machine which is particularly, although not exclusively, suitable for shelling Montana tung nuts which have a hard shell extending over one side only of the nut and which is simple to construct, maintain and operate. The machine may also be used for shelling nuts having a shell which is soft or readily frangible on one side of the nut.

In order that the invention may be more clearly understood, alternative constructions of machine, which are illustrative only thereof, will now be described with reference to the accompanying drawings in which:

Figs. 3 and 4 are elevation and plan views respectively, drawn to a larger scale, of the machine shown in Figs. 1 and 2, but with the cover removed;

Fig. 5 is a perspective view of a nut holder;

Fig. 6 is a fragmentary plan view showing the general construction of a nut holder;

Fig. 7 is a perspective view of a punch and ejector mechanism;

Figs. 8–11 are diagrammatic views showing successive stages of stripping a nut shell from a punch;

Figs. 12 and 13 show a modification of the invention having a carrier in the form of an endless belt;

Throughout the figures of the drawings like parts carry similar reference numerals.

Figure 1:
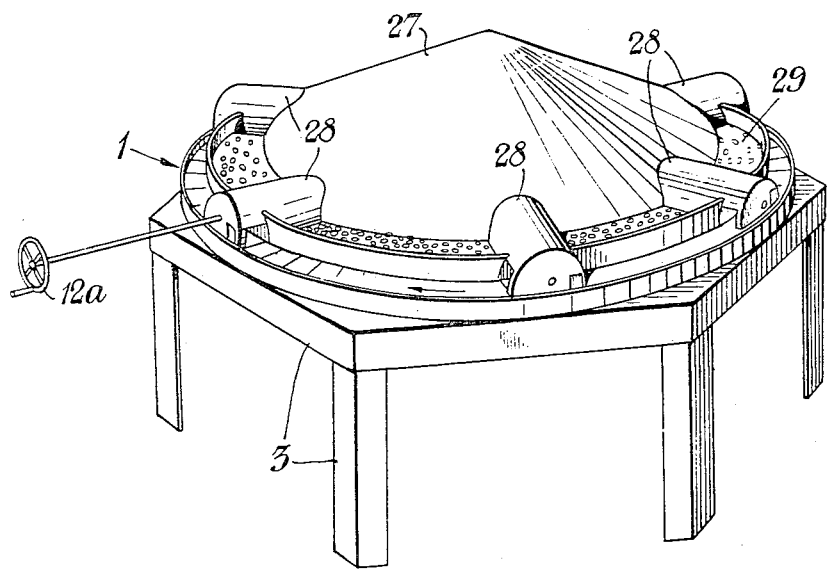
Fig. 1 is a perspective view of one form of nut shelling machine according to the invention with a cover in position.
Figure 2:
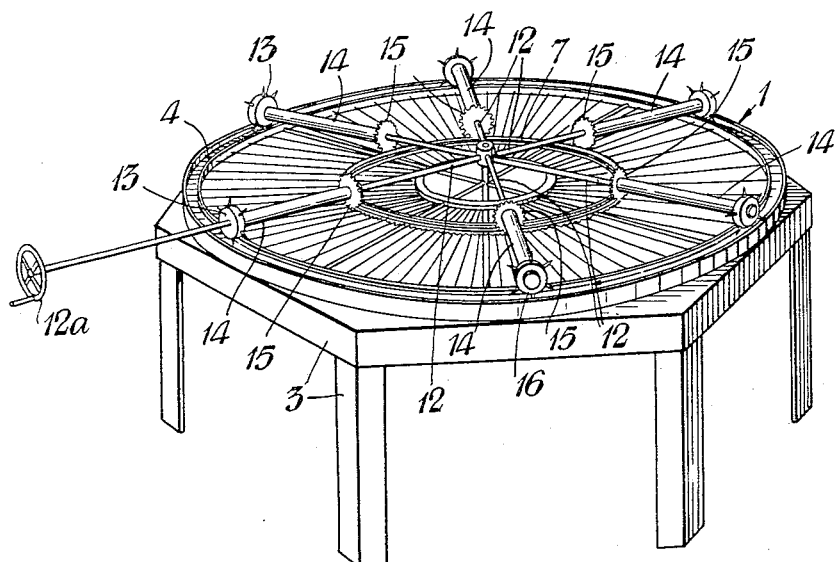
Fig. 2 is a perspective view of the machine shown in Fig. 1 with the cover and certain other parts removed for clarity of presentation.

Referring first to the form of machine illustrated in Figs. 1–11, a wheel 1 having an outside diameter of the order of, say, 3 ft., is mounted for rotation in a horizontal plane on rollers 2 on a supporting bench or structure 3 of a height such that an operator sitting at the bench has the wheel at a convenient level for placing nuts on the rim thereof. The wheel 1 consists of a relatively narrow outer rim or band 4 supported on four radial spokes 5 from a central spindle 6, an intermediate toothed ring 7 having two sets of teeth 7a, 7b and mounted concentrically with the rim 4, and an inner annular band 8 on which are pivoted a number of spring-loaded arms 9 constituting part of the nut holders 10 (to be described later).

The first set of teeth 7a on the toothed ring 7 is engaged by a driving pinion 11 mounted on one of six radial shafts 12 which do not move round with the wheel, the shaft carrying the driving pinion 11 being rotatable about its axis and being extended for a convenient distance beyond the rim 4 of the wheel to carry a driving crank or pulley 12a whereby the wheel 1 is rotated. The other five shafts 12 are non-rotatable and constitute supports for respective rotary ejector punch mechanisms indicated generally at 13. These five non-rotatable shafts 12 are mounted at their one ends in a boss 12b (Fig. 7) surrounding the rotatable spindle 6 and at their other ends in a bracket 12c. The shafts 12 each have rotatably mounted thereon a sleeve 14 which carries at its inner end a gear wheel 15 engageable with the second set of teeth 7b on the toothed ring 7. The outer end of each sleeve 14 has secured thereto a drum 16 which is located above the rim 4 of the wheel 1 and has a number of ejector punches 17—for example, six—projecting radially therefrom and each of a length such that it can penetrate the shell of a tung or like nut mounted in a holder 10 on the rim of the wheel 1 and so eject the kernel therefrom. The number of teeth on the gear wheel 15 are so arranged that a punch co-operates with each nut holder 10 as it passes beneath the punch.

The rim 4 of the wheel is provided with a number of apertures 18 which are equally spaced around the periphery thereof, and are of a size to allow the kernel of a tung nut to fall freely therethrough. At either end of each aperture 18 (considered in the circumferential direction) are located a pair of upstanding abutments 10a, 10b constituting nut supports, the one support 10a being fixed to the rim of the wheel 1 whilst the other support 10b is mounted on a respective radial arm 9 pivoted at its inner end on a pin 19 secured to the inner annular band 8 of the wheel. The support 10b is biased towards the fixed support 10a by means of a loading spring 20 which bears against the radial arm 9 and is anchored to the pivot pin 19 of an adjacent radial arm 9. Each fixed support 10a and each movable support 10b has an inward-facing shoulder or ridge in the form of a V block 21 to engage and support the corresponding end of the shell N of a tung nut (see Fig. 8) when the nut is placed thereon with the hard portion of the shell uppermost, the movable support 10b being self-adjusting by insertion of the nut itself, to accommodate nuts of varying length. Each pair of fixed and movable supports 10 thus constitutes a holder for the nuts to be shelled.

Spaced from the upper periphery of the ejector drum 16 is an arcuate stripper plate 22 which is located eccentrically with respect to the axis of rotation of the drum 16 and in this stripper plate is formed a slot 23 which is open at one end and is of a width less than the transverse dimension of the shell N of the tung nut. The end 23a of the stripper plate 22 through which the slot 23 opens lies nearest the axis of rotation of the drum 16 and is spaced therefrom at a distance such that an ejector punch 17 which has just operated on a nut passes into the slot 23 during its rotation. At the closed end 23b of the slot, however, the stripper plate 22 is located at a further distance from the axis of the drum 16 than the tips of the punches 17, and thus the latter are progressively withdrawn from the slot 23 in a radial direction as the drum 16 rotates. The remaining portion of the stripper plate 22 beyond the closed end 23b of the slot 23 is provided with a guide 24 for deflecting the shells N of the nuts into an appropriate receptacle 25 arranged beneath the bench 3.

The operation of this part of the machine is as follows. Whilst the wheel 1 is rotated at a relatively slow speed—for example, one or two revolutions per minute—an operator seated at a point between adjacent ejector punch mechanisms 13 places a tung nut in each holder 10 (see Fig. 8) with the hard portion N of the shell uppermost. As the nut is carried beneath an ejector punch mechanism 13, the latter is being rotated, through the drive wheel 15 connecting the sleeve 14 to the toothed ring 7, so that a punch 17 pierces the crown of the shell N (Fig. 8) and forces the kernel K of the nut downwards through the fibrous under-part of the shell so that it falls through the aperture 18 in the wheel rim 4. The kernel K falls directly into a receptacle 26 for shelled nuts. Alternatively, the kernel K may fall on to a chute (not shown) fixed to the framework 3 supporting the wheel 1, and be delivered to a central point.

As shown in Figs. 8–11, while the wheel 1 continues to rotate, the ejector punch 17 also rotates and removes the empty shell N from the holder 10, passing upwards to enter the open end 23a of the slot 23 in the stripper plate 22 with the empty shell N still held thereon. Continued rotation of the punch 17 brings the shell N into contact with the edges of the slot 23, due to the eccentricity of mounting of the stripper plate 22, so that the shell N is stripped from the punch 17 and falls through the guides 24 at the lower end of the plate 22 into an empty shell receptacle 25.

From the above description, it will be understood that the spacing of the apertures 18 in the rim of the wheel 1 and the number of ejector punches 17 mounted on a drum 16 determine the ratio of the gearing 7b, 15 so that a punch 17 is presented at the correct instant to each nut holder 10. The punches 17 are preferably blunted at their working ends so that, whilst being sharp enough to penetrate the hard shell N of the nut, they do not penetrate the kernel K and cause the latter to remain on the punch 17 when the shell N is removed from the holder 10 and stripped.

Each of the other five radial shafts 12, which are fixed, carries a similar construction of sleeve 14 and rotary ejector punch mechanism 13 and stripper plate 22 so that, for a wheel 1 of the approximate dimensions given, six operators can be seated around its periphery to place nuts in the holders 10 as the latter leave an ejector punch mechanism 13 and before they pass beneath the next such mechanism 13. By means of such a machine it has been found possible to obtain an output of about three-quarters of a ton of shelled nuts per day.

A cover plate 27 (Fig. 1) may be mounted over the wheel 1 having a shallow conical centre portion from which project six radial housings 28 enclosing the ejector punch mechanism 13. The rim 29 of the cover plate is of open trough form so that the cover plate 27 constitutes a reservoir for nuts to be shelled which can be replenished from time to time without interrupting the operation of the machine.

In the alternative construction of nut shelling machine shown in Figs. 12 and 13, the rotating drum 16 is driven from an endless conveyor belt or band 30 which consists of a plurality of spaced slats 31 secured to an endless web 32 which, for example, is made of woven material. On one side of the slats 31 are arranged a row of nut holders 10 similar in construction to those in Figs. 1–11. Each holder 10 spans the space between a pair of adjacent slats 31, and the web 32 is apertured at 18 between each fixed and movable support 10a, 10b respectively of each holder 10 for the passage therethrough of a nut kernel.

The conveyor belt 30 passes around a drive wheel 34 at one end and around an idler wheel 35 at the other.

A number of ejector punch mechanisms 13 are arranged at intervals above the upper pass 30a (Fig. 13) of the conveyor belt. These mechanisms are similar in construction to those previously described. The ejector punches 17 are carried on shafts 36 driven through gears 37, 38 the latter being mounted on a common drive shaft 39 and geared to the shaft of the driving wheel 34 at an appropriate ratio.

Beneath the apertures 18 are arranged chutes 40 for guiding the kernels of the nuts passing through the apertures 18 into the shelled nut receptacle 26. A second chute 41 is also provided below the end 23b of the stripper plate 22 for passing empty shells to the appropriate receptacle 25.

The chutes 40 and 41 are mounted on a post 42 which also supports the ejector shaft 36. A pair of rubbing plates 43 are mounted below the web 32 where it passes beneath each ejector mechanism 13 for supporting the web during the ejection operation.

A feed hopper 44 may be arranged for supplying nuts to be shelled to the conveyor at a point in advance of the first punch mechanism 13. The nuts may conveniently be accommodated on the web 32 between adjacent slats 31.

Figure 14:
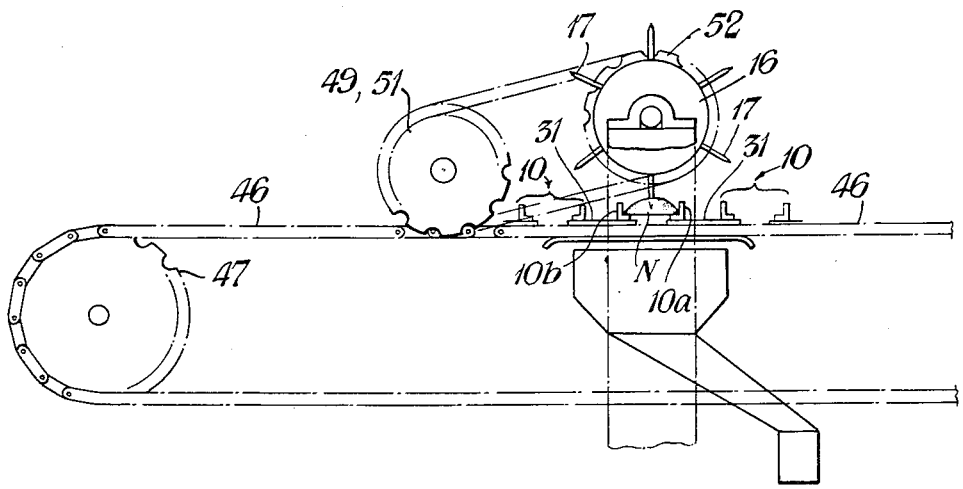
Figs. 14 and 15 show side and plan views of a further modification of the invention.
Figure 15:
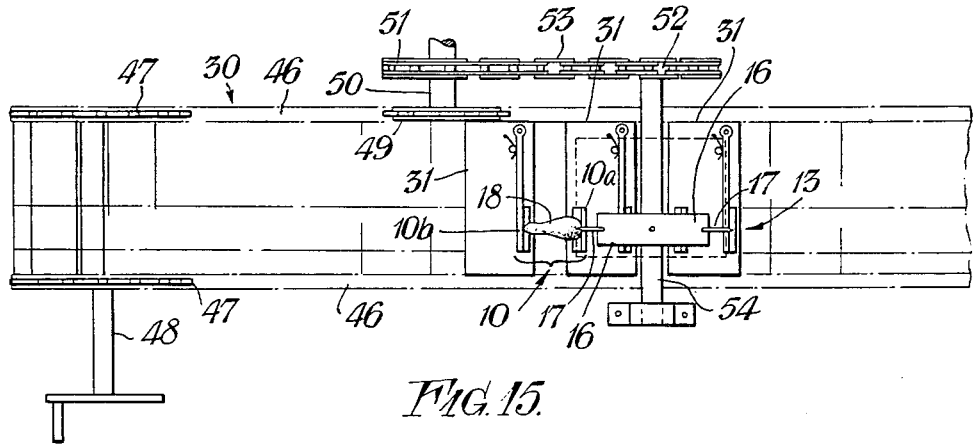

In a further alternative construction of nut shelling machine shown in Figs. 14 and 15, the machine is constructed substantially as shown in Figs. 12 and 13. The web 32, however, is replaced by a pair of endless chains 46. These endless chains pass around pairs of sprockets 47 one at each end of the conveyor. One pair of sprockets 47 is driven by a driving crank or pulley 12a on a shaft 48 and the other of which are idler sprockets.

A sprocket wheel 49 engages one of the endless chains 46. This wheel 49 is keyed on a shaft 50 on which is keyed a second sprocket wheel 51. Around the sprocket wheel 51 and around a further sprocket wheel 52 passes a second endless chain 53. The wheel 52 is keyed to a shaft 54 which is also keyed to the ejector mechanism 17. Thus, as the conveyor belt 30 is traversed, the sprocket 49 is rotated and drives the associated ejector mechanism 13.

Modifications of structural details may be adopted in any of the forms of the invention shown in the drawings. For example, alternative designs of nut holder 10 may be used if preferred, whilst the conveyor belt 30 may be of any convenient alternative construction. Furthermore, ejector mechanisms 13 may be arranged on both sides of the conveyor belt 30.

What I claim is:

1. A nut shelling machine comprising a carrier, a rotatable shaft and at least one radially displaced nut shell penetrating punch extending outwardly from the shaft and located above the carrier, means on the carrier for supporting nuts as they pass beneath the punches, means for moving the carrier, means for moving the punches in synchronism with the movement of the carrier for presenting the punch to successive nuts to be shelled to eject the kernel therefrom, and an arcuate slotted stripper blade mounted eccentrically to the axis of the shaft carrying the punch and mounted adjacent the plane of the punches to co-operate with the punch for stripping the empty shell after the ejection operation.

2. A nut shelling machine as claimed in claim 1 wherein the carrier comprises an endless belt conveyor.

3. A nut shelling machine according to claim 2, wherein the ejector means is driven by the endless belt conveyor.

4. A machine for shelling tung and like nuts comprising a horizontally disposed wheel for carrying nuts to be shelled, nut-supporting means located around the periphery of the wheel, a rotatable drum mounted above the nut supporting means, a nut shell penetrating punch rigidly secured to and extending radially outwards from the drum, means for rotating the drum to move the punch toward the nut supporting means and for moving the carrier, and means for effecting relative synchronous motion between the said punch and the nut-supporting means on the carrier to cause the punch to penetrate the shell of a nut to eject the kernel therefrom.

5. A machine for shelling tung and like nuts comprising a rigid framework, a carrier wheel mounted on the framework for rotation about a vertical axis, a plurality of nut supports spaced around the carrier wheel, a plurality of spindles extending radially from the centre of the wheel and located in a plane above and parallel to the plane of the carrier wheel to co-operate with the wheel, a plurality of nut shell penetrating punches rigidly secured to and extending radially of each spindle, on rotation to pierce the shells of successive nuts passing beneath the spindles and to eject the kernel therefrom, driving means mounted on the free end of one of the said spindles for rotating it, a driving gear wheel secured on said spindle, a rack on the carrier wheel intermediate its centre and its periphery thereof to mesh with the said driving gear wheel, a second concentric rack fixed on the carrier wheel rigidly coupled to each punch to rotate it and meshing with the said second rack.

References Cited in the file of this patent

UNITED STATES PATENTS

| | | |
|---|---|---|
| 631,069 | Fenn | Aug. 15, 1899 |
| 940,327 | Knapp | Nov. 16, 1909 |
| 1,356,997 | Nichols | Oct. 26, 1920 |
| 1,357,004 | Robbins | Oct. 26, 1920 |
| 1,735,406 | Moore | Nov. 12, 1929 |
| 1,901,042 | Robbins | Mar. 14, 1933 |
| 1,921,238 | Milan | Aug. 8, 1933 |
| 2,180,647 | Steinbiss | Nov. 21, 1939 |
| 2,243,530 | Kok | May 27, 1941 |
| 2,246,851 | Jordon | June 24, 1941 |
| 2,298,613 | Carroll et al. | Oct. 13, 1942 |
| 2,343,496 | Carroll | Mar. 7, 1944 |